Aug. 8, 1961  F. E. MUNSCHAUER, JR  2,995,169

PRESS BRAKE

Filed March 14, 1958  3 Sheets-Sheet 1

INVENTOR.
Frederick E. Munschauer, Jr.,
BY
Bean, Brooks, Buckley & Bean.
ATTORNEYS.

Aug. 8, 1961  F. E. MUNSCHAUER, JR  2,995,169

PRESS BRAKE

Filed March 14, 1958  3 Sheets-Sheet 3

INVENTOR.
Frederick E. Munschauer, Jr.,
BY
Bean, Brooks, Buckley & Bean.
ATTORNEYS.

2,995,169
PRESS BRAKE
Frederick E. Munschauer, Jr., Eggertsville, N.Y., assignor to Niagara Machine & Tool Works, Buffalo, N.Y.
Filed Mar. 14, 1958, Ser. No. 721,516
4 Claims. (Cl. 153—21)

This invention relates to sheet metal working machines and more particularly to power driven press brakes.

Power press brakes for bending sheet metal are well known and widely used in the metal working art. The present invention provides a power press brake with a novel driving and power transmission arrangement by virtue of which the fabrication of the machine frame and the assembly of the drive means is rendered extremely simple and economical. In particular, the necessity for precision machining of the frame member is minimized by reason of the fact that virtually the entire transmission assembly is supported by and located from the main crank or eccentric shaft of the machine.

Speaking generally, a gear housing includes spaced bearings mounted on the main shaft whereby the housing is supported on the shaft. An anti-torque arm rigid with the gear housing is fixedly connected to the machine frame to maintain the housing against rotation on the main shaft. A transmission shaft is in turn rotatably supported in bearings formed in the housing and, in the present instance, comprises a worm drive shaft engaging a worm wheel fixed to the main shaft.

A portion of the transmission shaft extends from the housing, rearwardly in the present instance, and supports clutch and flywheel means. Thus the latter components require no other or further support from or connection with the general framework of the machine. In the illustrated instance the flywheel is belt-connected with an electric driving motor adjustably supported by the machine frame.

In the present instance a brake mechanism is mounted on the fore and aft transmission shaft forwardly of the gear housing whereby the brake torque is readily taken by the upper transverse frame structure or crown member. However, the brake may be incorporated in the clutch mechanism in any of the various clutch-brake combinations known to the prior art or the brake may comprise a separate component mounted on the rearwardly extending portion of the transmission shaft. In any event the proximity of the transmission shaft to the frame structure and the freedom from interfering parts makes it a simple matter to support the brake on the transmission shaft and connect with the frame structure to transmit the brake torque thereto.

A feature of the drive arrangement of the present invention results from the fore and aft disposition of the cross shaft and the disposition of the flywheel thereon, whereby the flywheel extends in a plane behind and parallel to the main shaft of the machine and therefore may be of any desired diameter without projecting from the machine proper and without imposing any space limitations on other portions of the machine structure. Furthermore, driving connection to the flywheel from the motor drive shaft of a motor mounted against one of the side frame members of the machine is direct and simple, as will appear from the embodiment set forth herein by way of example.

It will be noted that the short fore and aft transmission shaft involves no spanning of distance between driving and driven points and need be only long enough to accommodate and support the flywheel, clutch and brake components and the necessary driving connection with the crankshaft or eccentric shaft of the press brake. This provides a highly efficient drive arrangement which is relatively free of torsional deflection of the transmission shaft means and provides for efficient absorption of bearing loads.

A single specific embodiment of the principles of the present invention is illustrated in the accompanying drawing and described in detail in the following specification. However, it is to be understood that such embodiment is by way of example only and that various mechanical modifications may be introduced without departing from the teachings of the invention, the scope of which is limited only as defined in the appended claims.

Figure 1:
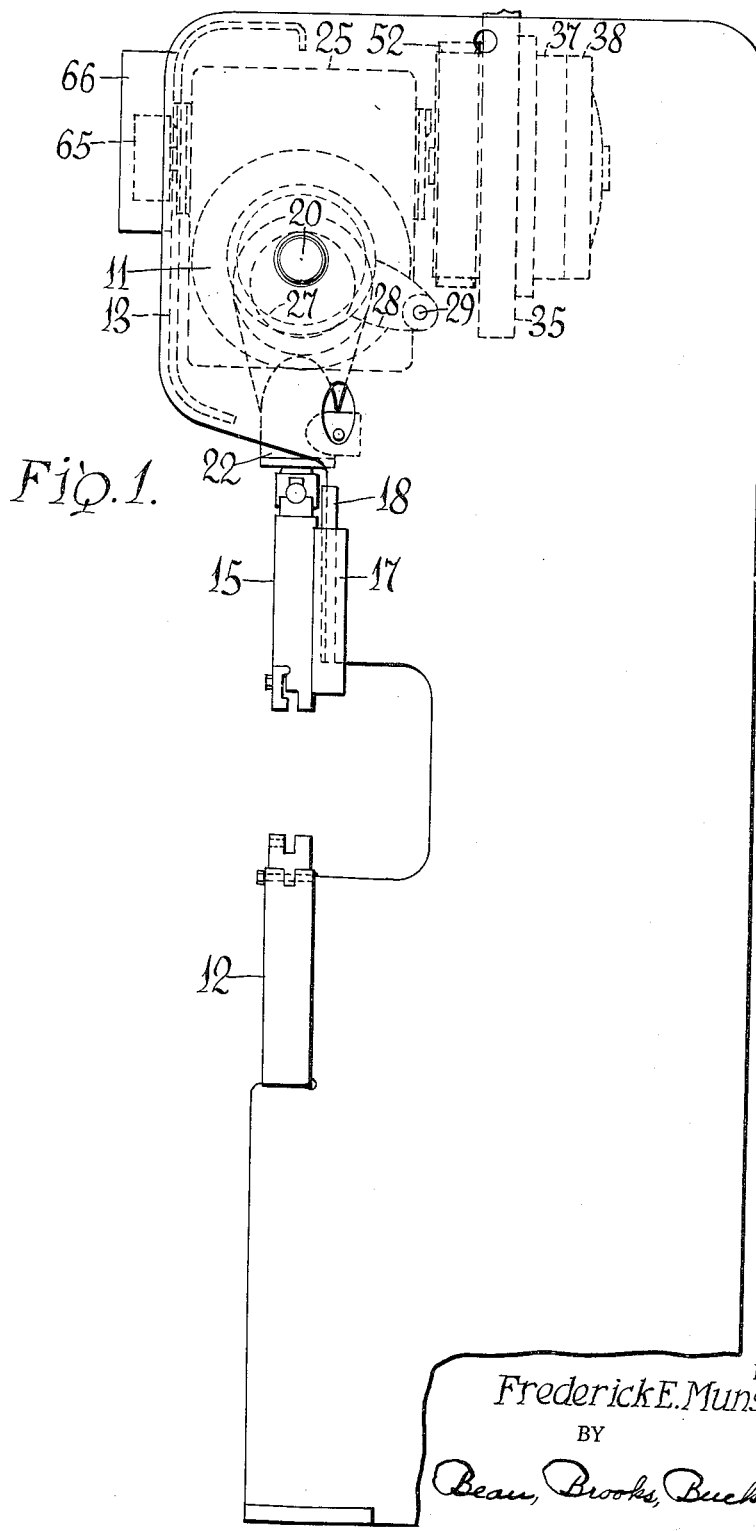
FIG. 1 is a general side elevational view of one form of the press brake of the present invention.
Figure 2:
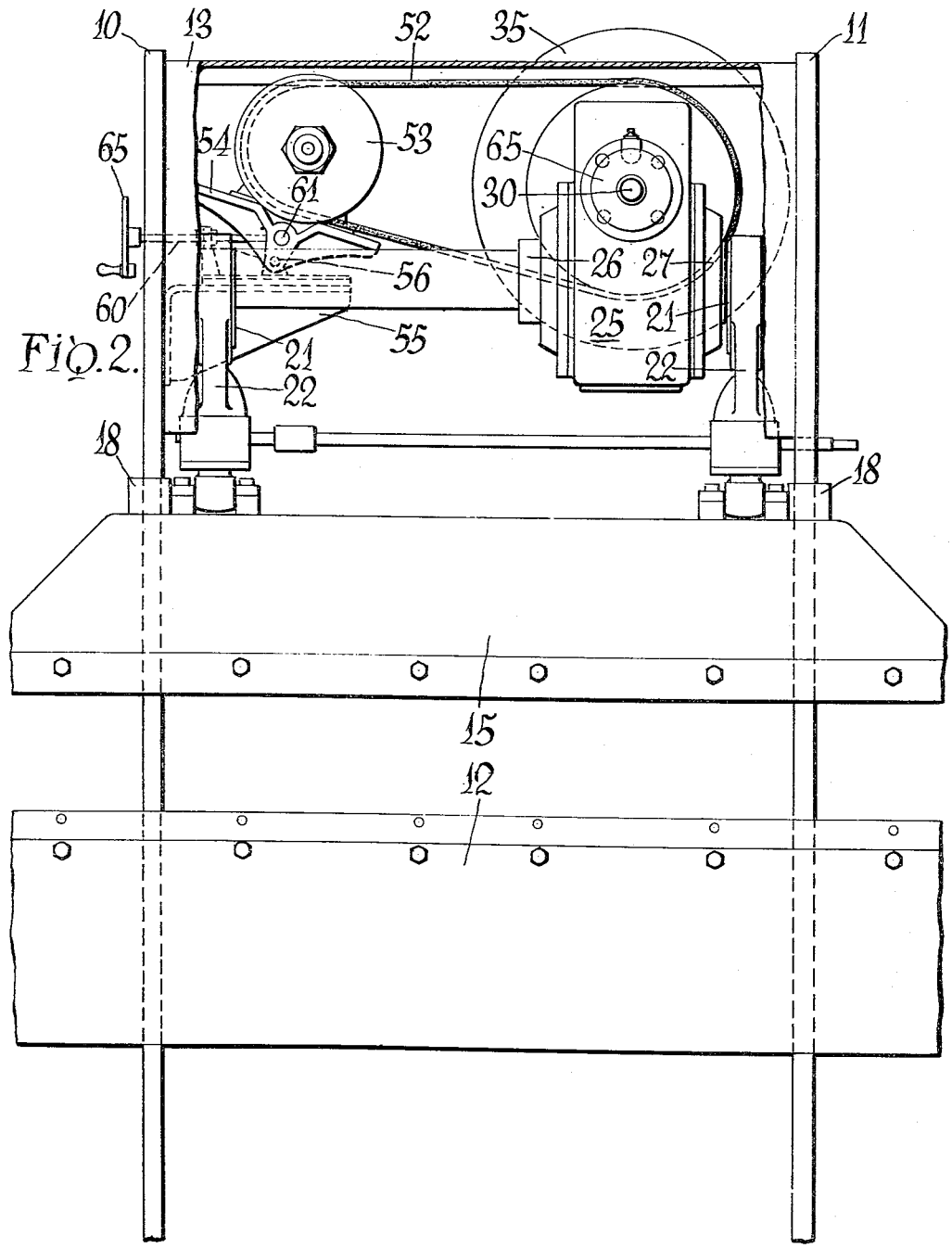
FIG. 2 is a front elevational view of the press brake of FIG. 1 with portions of the upper frame structure thereof broken away for added illustration.

Like characters of reference denote like parts throughout the several figures of the drawings and, referring particularly to FIGS. 1 and 2, the numerals 10 and 11 designate a pair of side frame members which, in the present instance comprise flat plates cut to the outline shown in FIG. 1. The side frame members are rigidly connected by a lower die supporting or bed member 12 and an upper crown or front wall member 13, the members 12 and 13 being welded to the side frame members 10 and 11 to form an integral machine frame structure.

A vertically reciprocable upper die supporting slide or ram is designated 15 and is guided for vertical movement by means of guides 17 and 18 fixed, respectively, to the slide 15 and the side frame members 10 and 11, as shown in FIG. 1. A main operating shaft 20 is journaled at its opposite ends in the side frame members 10 and 11 and has fixed thereto a pair of eccentrics 21 which connect with slide 15 for reciprocation of the latter by means of a pair of connecting rods 22. The eccentrics 21 may be in the form of eccentric blocks fixed to shaft 20 or may comprise conventional crank throws. The term "eccentric means" as used in the appended claims is generic to either of these conventional means of producing reciprocation of the slide 15.

As indicated previously herein, the arrangement of the transmission components of the press brake of the present invention is such that the flywheel, the clutch and other components are all generally supported by and located from the main shaft 20. This results in a minimum of precision machining of the frame structure, a simple and compact transmission arrangement, and one which provides for ready access to and disassembly of the driving and transmission parts.

Figure 4:
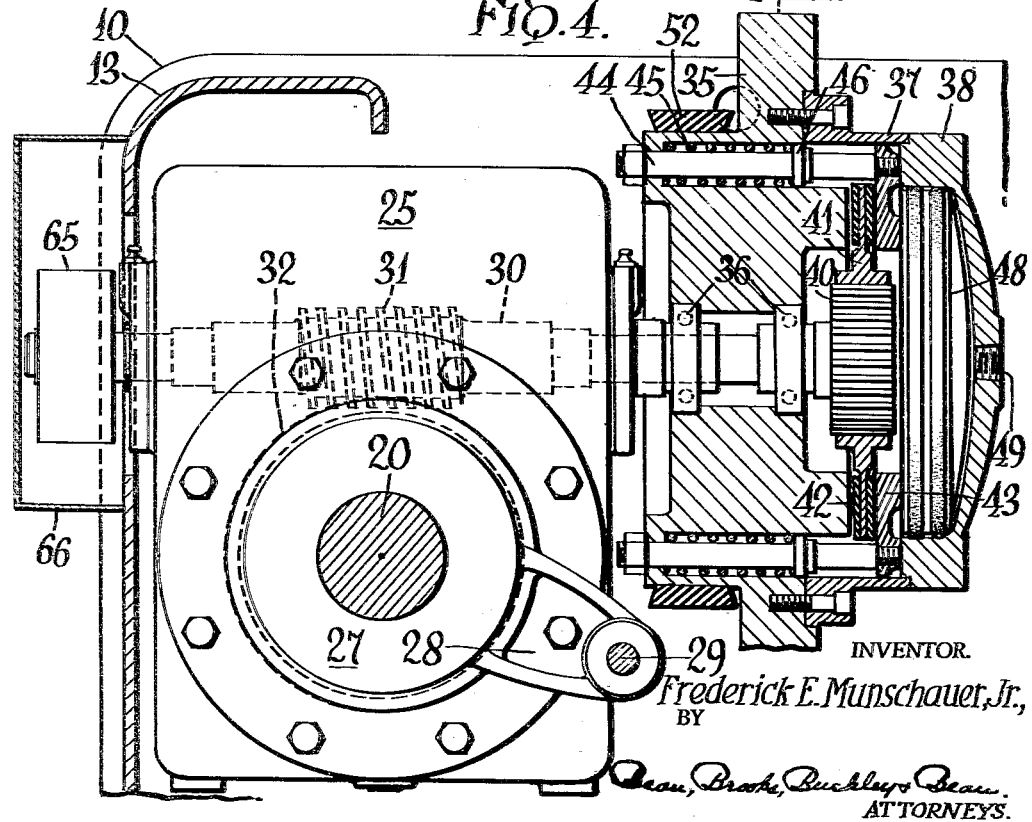
FIG. 4 is a cross sectional view on an enlarged scale taken approximately on the line IV—IV of FIG. 3.

Referring particularly to FIG. 4, a housing 25 is supported on shaft 20 by spaced bearings 26 and 27 and one of the bearings 27 includes a torque arm 28 which is fixed to the side frame member 11 by a pin 29, so that housing 25 remains relatively stationary despite the usual intermittent rotation of shaft 20. A cross shaft 30 is journaled in the front and rear walls of housing 25 and carries a worm 31 meshing with a worm wheel 32 fixed to shaft 20.

Cross shaft 30 extends rearwardly of housing 25 and a flywheel 35 is mounted for rotation thereon by antifriction bearings 36. Flywheel 35, in conjunction with an annular flange member 37 and a cover member 38, comprises a rotatable clutch housing which forms the driving member of a clutch mechanism which acts between the flywheel and the shaft 30. The structural details of the clutch mechanism are not a part of the present invention and are set forth only sufficiently to provide a full disclosure of an exemplary embodiment of the invention and insofar as they enter into the general drive arrangement and combination of the invention.

Referring particularly to FIG. 4, a spline member 40 is fixed to the rear end of cross shaft 30 and engages an internal spline formation in a clutch disc member 41, the faces of which act between an abutment 42 on flywheel 35 and a pressure plate 43. A plurality of studs 44 are threaded into pressure plate 43 and extend through flywheel 35.

Compression coil springs 45 housed in openings in flywheel 35 act against enlargements 46 on the studs 44 to urge pressure plate 43 normally to the right as viewed in FIG. 4. In this condition the clutch disc member 41 is released and rotates freely between abutment 42 and pressure plate 43.

Cover member 38 is formed to provide a fluid pressure chamber and a piston 48 disposed therein acts against pressure plate 43 to move the same to the left when fluid operating pressure is applied at the right-hand side of piston 48 as by way of a passage 49 in cover member 38. This engages the spline mounted clutch disc member 41 between abutment 42 and pressure plate 43 to cause cross shaft 30 to rotate with flywheel 35.

Figure 3:
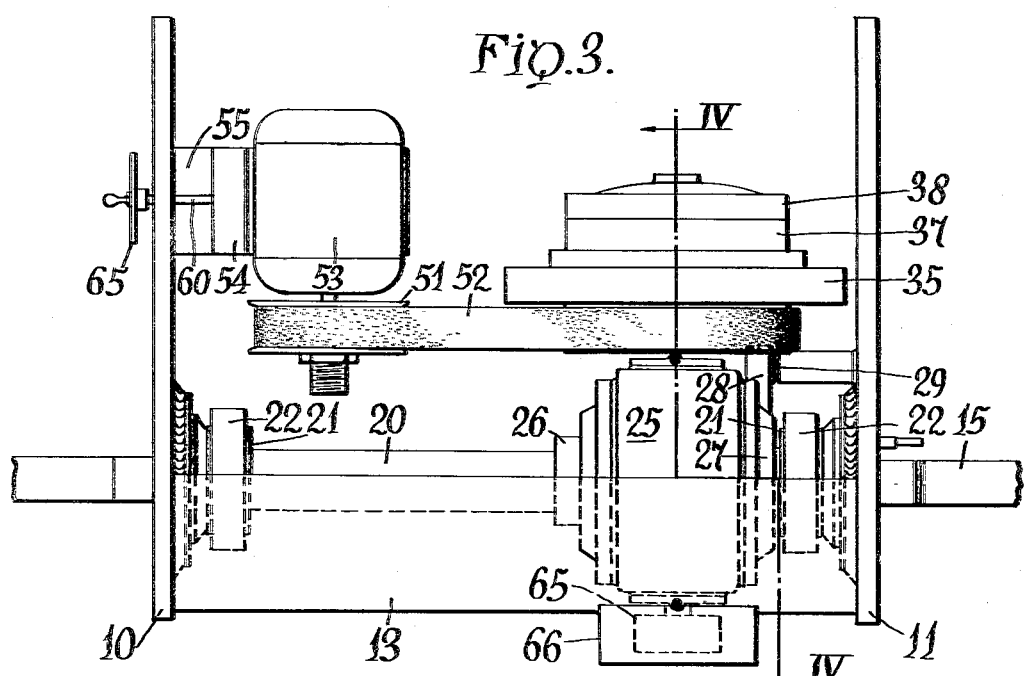
FIG. 3 is a top plan view of the press brake of FIGS. 1 and 2.

Flywheel 35 is connected to a drive pulley 51 as by means of a belt 52, pulley 51 being fixed to the output shaft of a driving motor 53, see FIGS. 2 and 3. Referring particularly to FIG. 2, motor 53 is mounted on a plate 54 which is pivoted to a frame mounted bracket 55 as at 56. A captive screw member 60 threads into a pin 61 rotatably mounted in the motor-mounting plate 54 and operation of a manual crank 65 pivots plate 54 about the pin 56 to move motor 53 and pulley 51 toward and way from flywheel 35 for adjustment of the connecting belt 52 in an obvious manner.

As stated in the preamble hereto, various types of brake mechanisms may be associated with shaft 30 either as separate components or as combination clutch-brake mechanisms in conjunction with the clutching means. Merely by way of example, the present embodiment illustrates, somewhat schematically, a brake means 65 mounted upon the flywheel end of shaft 30 in such position that suitable brake shoes (not shown) may be anchored to the upper front wall member 13. The brake mechanism 65 may be suitably encased as at 66 in FIGS. 3 and 4.

I claim:

1. In a press brake, a frame structure including a pair of side frame members and a bed member, a slide or ram and means mounting the same above said bed member for vertical reciprocation toward and away from said bed member, a shaft journaled at its opposite ends in said side frame members and having a pair of spaced eccentric members connected with said slide for reciprocation thereof, a transmission casing having bearings supporting the same on said shaft between and spaced from said frame members and means connecting between said casing and said frame structure to secure the casing against rotation on said shaft axle, a cross shaft journaled in said casing and extending rearwardly therefrom, gear means in said casing acting between said cross shaft and said first mentioned shaft for driving the latter from the former, a flywheel mounted for free rotation on the rearward extension of said cross shaft for rotation in a plane extending parallel to the axis of said first mentioned shaft, a clutch acting between said flywheel and said cross shaft, motor means mounted on said frame structure rearwardly of said drive shaft with its axis extending parallel to said cross shaft axis, and belt drive means between said motor means and said flywheel.

2. In a press brake, a frame structure including a pair of side frame members and a bed member, a slide or ram and means mounting the same above said bed member for vertical reciprocation toward and away from said bed member, a shaft journaled at its opposite ends in said side frame members and having a pair of spaced eccentric members connected with said slide for reciprocation thereof, a transmission casing having bearings supporting the same on said shaft between and spaced from said frame members and means connecting between said casing and said frame structure to secure the casing against rotation on said shaft axis, a cross shaft journaled in said casing and extending rearwardly therefrom, a worm on said cross shaft and a meshing worm wheel on said first mentioned shaft for driving the latter from the former, a flywheel mounted for free rotation on the rearward extension of said cross shaft, a clutch acting between said flywheel and said cross shaft, motor means mounted on said frame structure rearwardly of said drive shaft with its axis extending parallel to said cross shaft axis, and belt drive means between said motor means and said flywheel.

3. In a press brake, a frame structure including a pair of side frame members and a bed member, a slide or ram and means mounting the same above said bed member for vertical reciprocation toward and away from said bed member, a shaft journaled at its opposite ends in said side frame members and having a pair of spaced eccentric members connected with said slide for reciprocation thereof, a transmission casing having bearings supporting the same on said shaft between and spaced from said frame members and means connecting between said casing and said frame structure to secure the casing against rotation on said shaft axis, a cross shaft journaled in said casing and extending rearwardly therefrom, gear means in said casing acting between said cross shaft and said first mentioned shaft for driving the latter from the former, a flywheel mounted for free rotation on the rearward extension of said cross shaft for rotation in a plane extending parallel to the axis of said first mentioned shaft, a clutch acting between said flywheel and said cross shaft, motor means mounted on said frame structure rearwardly of said drive shaft with its axis extending parallel to said cross shaft axis, and drive means between said parallel shafts for operating said flywheel from said motor means.

4. In a press brake, a frame structure including a pair of side frame members and a bed member, a slide or ram and means mounting the same above said bed member for vertical reciprocation toward and away from said bed member, a shaft journaled at its opposite ends in said side frame members and having a pair of spaced eccentric members connected with said slide for reciprocation thereof, a transmission casing having bearings supporting the same on said shaft between and spaced from said frame members and means connecting between said casing and said frame structure to secure the casing against rotation on said shaft axis, a cross shaft journaled in said casing and extending rearwardly therefrom, a worm on said cross shaft and a meshing worm wheel on said first mentioned shaft for driving the latter from the former, a flywheel mounted for free rotation on the rearward extension of said cross shaft, a clutch acting between said flywheel and said cross shaft, motor means mounted on said frame structure rearwardly of said drive shaft with its axis extending parallel to said cross shaft axis, and drive means between said parallel shafts for operating said flywheel from said motor means.

References Cited in the file of this patent

UNITED STATES PATENTS

| | | |
|---|---|---|
| 299,290 | Stiles | May 27, 1884 |
| 1,504,196 | Wilson | Aug. 5, 1924 |
| 1,885,438 | Hazelton | Nov. 1, 1932 |
| 1,928,711 | Walsh | Oct. 3, 1933 |
| 2,092,092 | Sinclair | Sept. 7, 1937 |
| 2,136,856 | Long | Nov. 15, 1938 |
| 2,237,170 | Williamson | Apr. 1, 1941 |
| 2,432,886 | Hatch | Dec. 16, 1947 |
| 2,607,421 | Anderson | Aug. 19, 1952 |
| 2,639,619 | Gater | May 26, 1953 |
| 2,745,338 | Wissman | May 15, 1956 |
| 2,771,790 | Munschauer | Nov. 27, 1956 |
| 2,840,135 | Fowler | June 24, 1958 |
| 2,848,034 | Ernst | Aug. 19, 1958 |